(12) United States Patent
Fredriksen et al.

(10) Patent No.: US 6,664,352 B1
(45) Date of Patent: Dec. 16, 2003

(54) SUPPORTED POLYMERIZATION CATALYSTS

(75) Inventors: Siw Fredriksen, Stathelle (NO); Tore Dreng, Stathelle (NO); Vidar Almquist, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/807,144

(22) PCT Filed: Oct. 11, 1999

(86) PCT No.: PCT/GB99/03355

§ 371 (c)(1),
(2), (4) Date: Apr. 9, 2001

(87) PCT Pub. No.: WO00/22011

PCT Pub. Date: Apr. 20, 2000

(30) Foreign Application Priority Data

Oct. 9, 1998 (GB) ................................................ 9822123

(51) Int. Cl.⁷ .................................................. C08F 4/42

(52) U.S. Cl. .................. 526/160; 526/348; 526/943; 502/152; 502/87

(58) Field of Search ................... 502/152, 87; 526/160, 526/943, 348

(56) References Cited

U.S. PATENT DOCUMENTS

| | | |
|---|---|---|
| 3,907,956 A | 9/1975 | Meunier |
| 4,621,072 A | 11/1986 | Arnitz et al. |
| 5,559,071 A | 9/1996 | Abel et al. |
| 5,625,015 A | 4/1997 | Brinen et al. |
| 5,759,940 A * | 6/1998 | Sacchetti et al. ........... 502/134 |
| 5,789,332 A | 8/1998 | Kutschera et al. |

FOREIGN PATENT DOCUMENTS

| | | |
|---|---|---|
| EP | 0 024 933 | 3/1981 |
| EP | 0 763 545 | 3/1997 |
| GB | 1 314 005 | 4/1973 |
| GB | 1314005 | * 4/1973 |
| WO | WO94/14855 | 7/1994 |
| WO | WO95/11263 | 4/1995 |
| WO | WO95/12622 | 5/1995 |
| WO | WO95/13136 | 5/1995 |
| WO | WO95/15216 | 6/1995 |
| WO | WO 96/16092 | 5/1996 |
| WO | WO 96/16093 | * 5/1996 |
| WO | WO96/16093 | 5/1996 |

* cited by examiner

*Primary Examiner*—Ling-Siu Choi
(74) *Attorney, Agent, or Firm*—Nixon & Vanderhye P.C.

(57) ABSTRACT

The invention provides a process for the preparation of a supported polymerization catalyst, said process comprising impregnating a porous particulate support in a mechanically fluidized state with a catalyst material.

13 Claims, 2 Drawing Sheets

SUPPORTED POLYMERIZATION CATALYSTS

Figure 1:
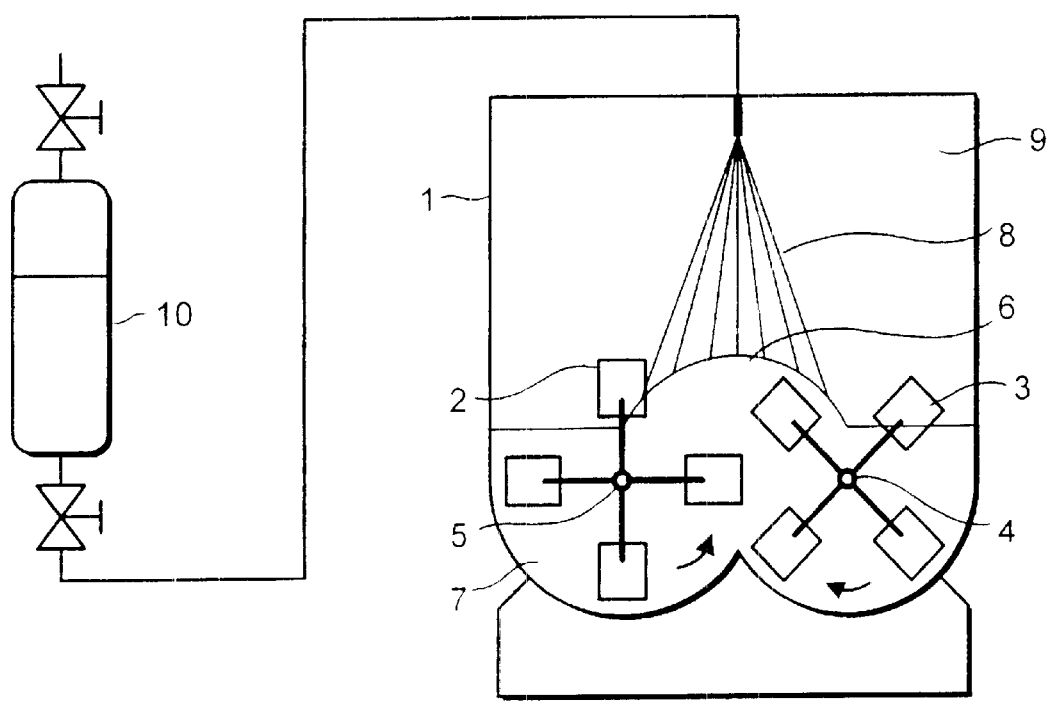

This invention relates to supported polymerization catalysts.

In the preparation of polymers, e.g. polyolefins and in particular polypropylenes and polyethylenes, it is conventional practice to use catalysts such as Ziegler Natta or metallocene catalysts. These, in particular the metallocene catalysts, may particularly effectively be used in supported form, i.e. where the catalyst has been impregnated into a porous, particulate inorganic or organic support material, e.g. an inorganic oxide such as silica, alumina, silica-alumina, or zirconia, an inorganic halide such as a magnesium chloride, or an organic polymer such as an acrylate or a styrene-divinylbenzene. The use of a support for the catalyst improves the handling characteristics of the polymer product and gives better control of reaction rates.

Such supported catalysts may be prepared by mixing the support (optionally after a heat treatment step) and a liquid containing the catalyst, using quantities of the liquid which are comparable to the pore volume of the support material such that catalyst waste is avoided. Using such small volumes of liquid, the formation of a mud or a slurry is avoided and in effect the mixing process is a dry-mixing process. While slurry mixing provides uniformity of loading of catalyst onto support which is superior to that achieved in conventional dry mixing, the volume of solvent used is significantly higher and this is environmentally undesirable. Moreover, with slurry mixing, the supported catalyst often has to be washed in order to avoid fouling in the polymerization reactor.

In general, the support and the catalysts are stirred during the impregnation step, e.g. using a magnetic stirrer or a helical stirrer.

The preparation of supported polymerization catalysts is described for example in NO-C-171858 (Neste), U.S. Pat. No. 5,559,071 (Hoechst), U.S. Pat. No. 5,625,015 (Exxon) WO95/11263 (Mobil), WO95/15216 (Borealis), WO95/12622 (Borealis), WO94/14855 (Mobil) and WO96/16093 (Exxon).

We have now found that the properties of such supported catalysts are improved if the mixing of catalyst and support is effected using mixing apparatus which creates a mechanically fluidized bed of the particulate support material in which catalyst impregnation may take place.

Many fluid bed devices are known—indeed at its simplest a fluid bed of a solid particulate material can be created by passing a continuous flow of gas through the particulate material. However by use of a mechanically created fluidized bed the loss of solvent during impregnation is avoided and gas generated fluid beds provide little if any mixing effect. By mechanically fluidized it is meant that bed fluidization is achieved at least partly through the use of agitation of the particles caused by a mechanical, ie. solid, apparatus, preferably a mixing apparatus, rather than solely by passage of a gas through the bed. Gas passage may be used in addition to mechanical agitation but, as mentioned above, this may be undesirable due to solvent loss.

Thus viewed from one aspect the invention provides a process for the preparation of a supported polymerization catalyst, e.g. a catalyst for the polymerization of $C_{2-10}$ α-olefins, in particular propylene and ethylene, said process comprising impregnating a porous particulate support in a mechanically fluidized state with at least one catalyst material or component thereof.

Viewed from a further aspect the invention provides the use of a supported catalyst prepared according to the process of the invention as a polymerization catalyst.

Viewed from a yet still further aspect the invention provides a method for the preparation of a polymer, said method comprising impregnating a mechanically fluidized porous particulate support material with a catalyst or two or more components thereof and polymerizing a monomer or monomer mixture in the presence of the catalyst-impregnated support material.

Mixing methods may be characterized by their Froude number (Fr) which is given by the equation $$Fr = \frac{R\omega^2}{g}$$

i.e. the ratio of centrifugal force to gravity. Mixers generally fall into the categories:

1. Froude number below 1 (e.g. thrust mixers and free fall mixers)
2. Froude number above 1 (e.g. fluid bed mixers)
3. Froude number considerably above 1 (e.g. centrifugal and intensive mixers).

The mixers used according to the present invention will generally have a Froude number of 1.005 to 2.8, more preferably 1.05 to 2.2.

More particularly, the mixers used according to the invention will preferably put at least 30% wt, more preferably at least 50% wt of the support material into a "weightless" condition when in operation (see for example Forberg, Mixing-powder handling and processing 4: 318 (September 1992)).

The support material used according to the invention is conveniently an inorganic or organic material, e.g. an inorganic oxide such as silica, alumina, silica-alumina, zirconia, magnesia or titania, talc or an inorganic halide such as magnesium chloride, or a polymer such as an acrylate, methacrylate or styrene-divinylbenzene. Silica, alumina or titania or combinations thereof loaded with chromium compounds e.g. chromium oxides, may also advantageously be used as support materials.

Preferably the support material, if inorganic, is subjected to a heat treatment (calcination) before catalyst impregnation, e.g. by a period of heat treatment in a dry, non-reducing (e.g. oxygen containing) atmosphere such as air at a temperature of at least 200° C., preferably at least 400° C. and especially preferably at least 600° C., for a period of 0.5 to 50 hours, e.g. 2 to 30 hours, preferably 10 to 20 hours. The support material before calcination conveniently has a surface area of 20 to 1000 $m^2/g$ (BET method), e.g. 100 to 400 $m^2/g$, a porosity of up to 5 mL/g, e.g. 0.2 to 3.5 mL/g and a mean particle size of 3 to 250 $\mu$m, especially 5 to 200 $\mu$m, preferably 5 to 100 $\mu$m, e.g. 5 to 50 $\mu$m, in particular 10 to 40 $\mu$m. The average pore diameter in the support is preferably 10 to 1000 Å, e.g. 50 to 900 Å, more preferably 40 to 350 Å. Examples of suitable support materials include Sylopol 2109 (a silica available from Grace Davison with an average particle size of 20 $\mu$m and a pore volume of 1.5–2.0 mL/g), ES70F (a silica available from Crosfield with an average particle size of 14 $\mu$m and a surface area of 281 $m^2/g$) and MD 747JR (a silica available from Crosfield with an average particle size of 20 $\mu$m). SP9-275, Davison 955, Davison 948, XP02408, SP9-10150, SP9-10156 Sylopol 5550, XP02403, Sylopol 55SJ, SP9-10180, and Sylopol 2104 silicas from Grace Davison, ES70 and ES70X silicas from Crosfield, and CS2133, CS2040, MS3040, MS3040F, SP2-7877, MS3040A and MS1733 silicas from PQ Corporation may also be used. Examples of suitable polymer supports include porous polypropylene and polyethylene available from Accurel or Akzo Nobel, and monodisperse polymethacrylates and polystyrenes available from Dyno Speciality Polymers, Lillestrøm, Norway.

Alternatively, the support material may be dehydrated chemically by reaction of surface hydroxyl groups with chemical agents such as for example chlorosilanes and aluminium alkyls. By way of example see EP-A-507876, EP-A-670336, EP-A-670325 and "The Chemistry of Silica", Chapter 6, R. K. Iler, Wiley, 1979.

The catalyst with which the support material is impregnated may be any polymerization catalyst or combination of two or more catalysts, optionally together with one or more co-catalysts or catalyst activators. Where two or more components, e.g. catalysts and co-catalysts, are used, these can be loaded onto the support sequentially or simultaneously. Preferably the catalyst is a Ziegler Natta catalyst (i.e. the combination of a transition metal (e.g. Ti, V or Cr) compound and an aluminium compound), a pyrazolyl catalyst (e.g. as described in WO97/17379, U.S. Pat. No. 4,808, 680, EP-A-482934, U.S. Pat. No. 5,312,394 or EP-A-617052) or an η-liganded metal catalyst, e.g. a metallocene catalyst. Such catalysts will generally be applied to the support in solution in a labile organic solvent, e.g. an aromatic solvent such as toluene, an aliphatic hydrocarbon solvent such as heptane or a halogenated aliphatic hydrocarbon such as methylene chloride or chloroform. Toluene is generally preferred.

Examples of suitable catalysts and co-catalysts are known from EP-A-206794, EP-A-22595, EP-A-129368, EP-A-520732, EP-A-561476, EP-A-279586, EP-A-420436, EP-A-347128, EP-A-551277, EP-A-648230, WO 94/03506, WO 96/28479, U.S. Pat. No. 5,057,475, EP-A-672688, EP-A-368644, EP-A-491842, EP-A-614468, EP-A-705281, WO 92/00333, WO 94/07928, WO 91/04257, WO 93/08221, WO 93/08199, WO 94/10180, U.S. Pat. Nos. 5,096,867, 5,055,438, 5,198,401, 5,264,405, 5,227,440, 4,530,914, 4,952,716, 5,127,418, 4,808,561, 4,897,455, 5,278,119, 5,304,614, 4,665,208, 4,952,540, 5,091,352, 5,206,199, 5,204,419, 4,874,734, 4,924,018, 4,908,463, 4,968,827, 5,308,815, 5,248,801, 5,235,081, 5,157,137, 5,103,031, 5,064,802, 5,149,819, 5,243,001, 5,239,022, 5,276,208, 5,296,434, 5,321,106, 5,304,614, WO 93/19103, WO 95/07939, WO 97/29134, WO 98/02470, WO 95/12622, U.S. Pat. Nos. 5,086,135, 5,455,214, WO 97/32707, EP-A-519237, EP-A-518092, EP-A-444474, EP-A-416815, EP-A-62979, EP-A-284708, EP-A-354893, EP-A-567952, EP-A-594218 and EP-A-661300.

For metallocene-based catalysts, the catalytically effective metal is preferably a transition metal or a lanthanide, especially a group 4, 5 or 6 metal, e.g. Ti, Zr or Hf. Such metallocenes include a η-bonding ligand, e.g. an optionally substituted optionally fused homo or heterocyclic cyclopentadienyl ligand, preferably with 1, 2 or 3 η-bonding groups coordinating the metal (the term metallocene is often used to denote complexes in which a metal is coordinated by η-bonding groups—here, however, it is used in its broader sense to cover complexes in which the metal is coordinated by one or more η-bonding groups, i.e. groups which use their Π-oribtals to complex the metal). Examples of such η-bonding ligands include cyclopentadienyl, indenyl, tetrahydroindenyl, fluorenyl and octahydrofluorenyl ligands and bridged dimers where such η-ligands are attached, e.g. via a 1, 2, 3 or 4 atom chain (e.g. containing C, N, O, S, Si or P chain atoms—for example an ethylene or Si(CH$_3$)$_2$ group), to a further such η-ligand.

Thus by way of example the metallocene catalyst may be of formula I

where Cp is a fused or non fused homo or heterocyclic cyclopentadienyl η-ligand;

R' is a hydrocarbyl, hydrocarbyloxy, hydrocarbylsilyloxy or hydrocarbylgermyloxy group containing 1 to 20 carbon atoms or one R' is a bridging group to a further fused or non fused homo or heterocyclic cyclopentadienyl η-ligand, the bridging group preferably providing a 1, 2, 3 or 4 atom chain between the cyclic groups, for example with C, N, O, S, P or Si chain atoms, especially C and/or Si, e.g. an ethylene group;

k is zero or an integer having a value of 1, 2, 3, 4 or 5;

M is a group 4, 5 or 6 metal;

X is a halogen atom;

R is hydrogen or a hydrocarbyl or hydrocarbyloxy group containing 1 to 20 carbon atoms;

m is the integer 1, 2 or 3;

n and q are zero or integers 1, 2 or 3; and the sum of m, n and q corresponds to the degree of coordination possible for M in the oxidation state in which it exists.

Preferably the metallocene contains at least one Cp group other than unsubstituted cyclopentadienyl, i.e. preferably the metallocene is a "substituted metallocene".

Particularly preferably the metallocene is a bridged bis-indenyl metallocene.

Many metallocene catalysts are known, e.g. as described in the patent publications mentioned above and the patent publications of Exxon, Mobil, BASF, DOW, Targor, Fina, Hoechst and Borealis, e.g. EP-A-206749, EP-A-413326, EP-A-129368, WO99/40129 etc.

Typical examples of ligands suitable for metallocenes include the following:

cyclopentadienyl, indenyl, fluorenyl, pentamethyl-cyclobutadienyl, methyl-cyclopentadienyl, 1,3-di-methyl-cyclopentadienyl, i-propyl-cyclopentadienyl, 1,3-di-i-propyl-cyclopentadienyl, n-butyl-cyclopentadienyl, 1,3-di-n-butyl-cyclopentadienyl, t-butyl-cyclopentadienyl, 1,3-di-t-butyl-cyclopentadienyl, trimethylsilyl-cyclopentadienyl, 1,3-di-trimethylsilyl-cyclopentadienyl, benzyl-cyclopentadienyl, 1,3-di-benzyl-cyclopentadienyl, phenyl-cyclopentadienyl, 1,3-di-phenyl-cyclopentadienyl, naphthyl-cyclopentadienyl, 1,3-di-naphthyl-cyclopentadienyl, 1-methyl-indenyl, 1,3,4-tri-methyl-cyclopentadienyl, 1-i-propyl-indenyl, 1,3,4-tri-i-propyl-cyclopentadienyl, 1-n-butyl-indenyl, 1,3,4-tri-n-butyl-cyclopentadienyl, 1-t-butyl-indenyl, 1,3,4-tri-t-butyl-cyclopentadienyl, 1-trimethylsilyl-indenyl, 1,3,4-tri-trimethylsilyl-cyclopentadienyl, 1-benzyl-indenyl, 1,3,4-tri-benzyl-cyclopentadienyl, 1-phenyl-indenyl, 1,3,4-tri-phenyl-cyclopentadienyl, 1-naphthyl-indenyl, 1,3,4-tri-naphthyl-cyclopentadienyl, 1,4-di-methyl-indenyl, 1,4-di-i-propyl-indenyl, 1,4-di-n-butyl-indenyl, 1,4-di-t-butyl-indenyl, 1,4-di-trimethylsilyl-indenyl, 1,4-di-benzyl-indenyl, 1,4-di-phenyl-indenyl, 1,4-di-naphthyl-indenyl, methyl-fluorenyl, i-propyl-fluorenyl, n-butyl-fluorenyl, t-butyl-fluorenyl, trimethylsilyl-fluorenyl, benzyl-fluorenyl, phenyl-fluorenyl, naphthyl-fluorenyl, 5,8-di-methyl-fluorenyl, 5,8-di-i-propyl-fluorenyl, 5,8-di-n-butyl-fluorenyl, 5,8-di-t-butyl-fluorenyl, 5,8-di-trimethylsilyl-fluorenyl, 5,8-di-benzyl-fluorenyl, 5,8-di-phenyl-fluorenyl and 5,8-di-naphthyl-fluorenyl.

Examples of particular metallocenes are listed on pages 10 to 35 of WO99/40129, the contents of which are hereby incorporated by reference.

Thus examples of particular metallocenes include dimethylsilandiylbis(indenyl)zirconiumdichloride, dimethylsilandiylbis(4-naphthyl-indenyl)zirconiumdichloride, dimethylsilandiylbis(2-methyl-benzo-indenyl)zirconiumdichloride, dimethylsilandiylbis(2-methyl-indenyl)zirconiumdichloride, dimethylsilandiyl-bis(2-methyl-4-(1-naphthyl)-indenyl)zirconiumdichloride, dimethylsilandiylbis(2-methyl-4-(2-naphthyl)-indenyl)zirconiumdichloride, dimethylsilandiylbis(2-methyl-4-phenyl-indenyl)zirconiumdichloride, dimethyl-silandiylbis(2-methyl-4-t-butyl-indenyl)zirconium-dichloride, dimethyl-silandiylbis(2-methyl-4-isopropyl-indenyl)zirconium-dichloride, dimethylsilandiylbis(2-methyl-4-ethyl-indenyl)zirconiumdichloride, dimethyl-silandiylbis(2-methyl-4-acenaphth-indenyl)zirconium-dichloride, dimethylsilandiylbis(2,4-dimethyl-indenyl)zirconiumdichloride, dimethylsilandiylbis(2-ethyl-indenyl)zirconiumdichloride, dimethylsilandiylbis(2-ethyl-4-ethyl-indenyl)zirconiumdichloride, dimethyl-silandiyl-bis(2-ethyl-4-phenyl-indenyl)zirconium-dichloride, dimethylsilandiylbis(2-methyl-4,5-benzo-indenyl)zirconiumdichloride, dimethylsilandiylbis(2-methyl-4,6 diisopropyl-indenyl)zirconiumdichloride, dimethyl-silandiylbis(2-methyl-4,5 diisopropyl-indenyl)zirconium-dichloride, dimethylsilandiylbis-(2,4,6-trimethyl-indenyl)zirconiumdichloride, dimethylsilandiylbis(2,5,6-trimethyl-indenyl)zirconiumdichloride, dimethyl-silandiylbis(2,4,7-trimethyl-indenyl)zirconiumdichloride, dimethylsilandiylbis(2-methyl-5-isobutyl-indenyl)zirconiumdichloride, dimethyl-silandiylbis(2-methyl-5-t-butyl-indenyl)zirconium-dichloride, methyl(phenyl)silandiylbis(2-methyl-4-phenyl-indenyl)zirconiumdichloride, methyl(phenyl)silandiylbis(2-methyl-4,6 diisopropyl-indenyl)zirconiumdichloride, methyl(phenyl)silandiylbis(2-methyl-4-isopropyl-indenyl)zirconiumdichloride, methyl(phenyl)silandiylbis-(2-methyl-4,5-benzo-indenyl)zirconium-dichloride, methyl(phenyl)silandiylbis(2-methyl-4,5-(methylbenzo)-indenyl)zirconiumdichloride, methyl(phenyl)silandiylbis-(2-methyl-4,5-(tetramethylbenzo)-indenyl)zirconiumdichloride, methyl(phenyl)silandiylbis(2-methyl-4-acenaphth-indenyl)zirconiumdichloride, methyl(phenyl)-silandiylbis(2-methyl-indenyl)zirconium-dichloride, methyl(phenyl)silandiylbis(2-methyl-5-isobutyl-indenyl)-zirconiumdichloride, 1,2-ethandiylbis(2-methyl-4-phenyl-indenyl)zirconiumdichloride, 1,4-butandiylbis(2-methyl-4-phenyl-indenyl)zirconium-chloride, 1,2-ethandiylbis-(2-methyl-4,6 diisopropyl-indenyl)zirconiumdichloride, 1,4-butandiylbis(2-methyl-4-isopropyl-indenyl)zirconium-dichloride, 1,4-butandiylbis(2-methyl-4,5-benzo-indenyl)zirconiumdichloride, 1,2-ethandiylbis(2-methyl-4,5-benzo-indenyl)zirconium-dichloride, 1,2-ethandiylbis(2,4,7-trimethyl-indenyl)zirconiumdichloride, 1,2-ethandiylbis(2-methyl-indenyl)zirconiumdichloride, 1,4-butandiylbis(2-methyl-indenyl)zirconiumdichloride, [4-($0^5$-cyclopentadienyl)-4,6,6-trimethyl-($0^5$-4,5-tetrahydropentalen)]-dichlorozirconium, dimethyl-silandiylbis(2-methyl-4-(4'-tert-butyl-phenyl)-indenyl)zirconiumdichloride, dimethyl-silandiylbis(2-methyl-4-(4'-methyl-phenyl)-indenyl)zirconiumdichloride, dimethylsilandiylbis(2-methyl-4-(4'-ethyl-phenyl)-indenyl)zirconiumdichloride, dimethyl-silandiylbis(2-methyl-4-(4'-trifluormethyl-phenyl)-indenyl)zirconiumdichloride, dimethylsilandiyl-bis(2-methyl-4-(4'-methoxy-phenyl)- indenyl)zirconium-dichloride, dimethylsilandiylbis(2-ethyl-4-(4'-tert-butyl-phenyl)-indenyl)zirconiumdichloride, dimethyl-silandiylbis(2-ethyl-4-(4'-methyl-phenyl)-indenyl)-zirconiumdichloride, dimethylsilandiylbis(2-ethyl-4-(4'-ethyl-phenyl)-indenyl)zirconiumdichloride, dimethylsilandiylbis(2-ethyl-4-(4'-trifluormethyl-phenyl)-indenyl)-zirconium-dichloride, and dimethylsilandiylbis(2-ethyl-4-(4'-methoxy-phenyl)-indenyl)zirconium-dichloride.

Further examples include bis(trimethylsilyl) silanediyldicyclopentadienylzirconium dichloride, bis (trimethylsilyl)silanediyldiindenylzirconium dichloride, bis (trimethylsilyl)silanediylbis(2-methyl-indenylzirconium dichloride, bis(trimethylsilyl)silanediylbis(2-methyl-4,5-benzoindenyl)zirconium dichloride, bis(trimethylsilyl) silanediylbis(2-methyl-4-phenyl-indenyl)zirconium dichloride, bis(trimethylsilyl)silanediylbis(2-methyl-4-naphthylindenyl)zirconium dichloride, bis(trimethylsilyl) silanediyldifluorenylzirconium dichloride, bis (trimethylsilyl)silanediyl(fluorenyl)-(cyclopentadienyl) zirconium dichloride, bis(trimethylsilyl)silanediyl (fluorenyl)(indenyl)zirconium dichloride, bis(trimethylsilyl) silanediyl(tetramethylcyclopentadienyl)(indenyl)zirconium dichloride, methyl(trimethylsilyl) silanediyldicyclopentadienyl-zirconium dichloride, methyl (trimethylsilyl)silanediyl-diindenylzirconium dichloride, methyl(trimethylsilyl)-silanediylbis(2-methylindenyl) zirconium dichloride, methyl(trimethylsilyl)silanediylbis(2-methyl-4,5-benzoindenyl)zirconium dichloride, methyl (trimethylsilyl)silanediylbis(2-methyl-4-phenylindenyl) zirconium dichloride, methyl(trimethylsilyl)silanediylbis(2-methyl-4-naphthylindenyl)zirconium dichloride, methyl (trimethylsilyl)silanediyldifluorenylzirconium dichloride, methyl(trimethylsilyl)silanediyl(fluorenyl)-(cyclopentadienyl)zirconium dichloride, methyl-(trimethylsilyl)silanediyl(fluorenyl)(indenyl)zirconium dichloride and methyl(trimethylsilyl)silanediyl (tetramethylcyclopentadienyl)(indenyl)zirconium dichloride, and the dimethylsilanediyl analogs thereof.

The catalysts may require the use of a co-catalyst or catalyst activator. Preferred as co-catalysts are the aluminoxanes, in particular the $C_{1-10}$ alkyl aluminoxanes and most particularly methyl aluminoxane (MAO).

Such aluminoxanes may be used as the sole co-catalyst or alternatively may be used together with other co-catalysts. Thus besides or in addition to aluminoxanes, other cation complex forming catalyst activators may be used. In this regard mention may be made of the silver and boron compounds known in the art. What is required of such activators is that they should react with the metallocene or pyrazolyl complex to yield an organometallic cation and a non-coordinating anion (see for example the discussion on non-coordinating anions J⁻ in EP-A-617052 (Asahi)).

Aluminoxane co-catalysts are described by Hoechst in WO94/28034. These are linear or cyclic oligomers having up to 40, preferably 3 to 20, —[Al(R")O]— repeat units (where R" is hydrogen, $C_{1-10}$ alkyl (preferably methyl) or $C_{6-18}$ aryl or mixtures thereof).

Where a co-catalyst is used, it may be used separately but more preferably it is also loaded onto the porous support material. In this event it is preferred to allow the catalyst and the co-catalyst to react in a liquid phase and to load the reaction product onto the support.

The support impregnation according to the invention is preferably effected by contacting the fluidized support with the catalyst and/or co-catalyst in a liquid, or less preferably a gaseous form, e.g. in solution in an organic solvent. The volume of liquid used is preferably 0.5 to 2.0, more preferably 0.8 to 1.5, especially 0.9 to 1.25, more especially 1.01 to 1.20, for example 0.9 to 1.1, times the pore volume of the support material. Most preferably the volume of liquid is such that an essentially dry mixing occurs, i.e. it is preferred to use a quantity insufficient to form a mud or a slurry with the support material.

Impregnation of the support material is especially preferably achieved by spraying the catalyst and/or co-catalyst liquid or solution onto the mechanically fluidized bed in the mixing apparatus. The portion of the support material bed which is mechanically fluidized may be a large or small part of the overall bed; desirably however at least 30%, more particularly at least 50%, of the bed is in fluidized form when the mechanical agitators in the mixer are in motion.

The liquid or solution is preferably directed substantially only (e.g. at least 90%) onto the mechanically fluidized surface and preferably it is directed onto at least 50% of the fluidized surfaces. Any appropriate spray geometry may be used; however the spray rate is desirably substantially uniform over the surface area sprayed. Spraying may be continuous, intermittent or batchwise and if desired spray rate may be varied continuously or intermittently. Spraying may involve application of a fine liquid stream and/or production of droplets, e.g. of 1 μm to 2 mm diameter, preferably a diameter beneath that of the support material particle size, e.g. 1 to 60%, more preferably 5 to 40% of particle size. The spray may be applied using any appropriate means, e.g. nozzles, sprinklers, atomizers, deflectors, etc. The solution may also be added simply by means of a dip tube.

Several forms of mechanical agitation of the particulate support material may be used to produce a mechanically fluidized material; however it is particularly effective to use horizontal axis, counter-rotating, interlocking mixing paddles, i.e. where paddles on different but preferably parallel rotational axes pass through a common mixing zone. Such fluidized bed mixing apparatus are available from: H. Forberg A S, Norway; H. R. Gericke Ltd.,. Switzerland (e.g. Gericke Multi-Flux Mixers and Twin-Shaft Mixers); and IdeCon, Norway. The Forberg mixer is illustrated schematically in FIG. 1 of the accompanying drawings.

Such mixers may if desired be fitted with temperature control devices, e.g. heating or cooling jackets. Likewise, the mixing chamber may be fitted with pressure control devices, e.g. pressure or vacuum pumps, so that the pressure within the mixing chamber may be controlled to a desired atmospheric, sub-atmospheric or elevated pressure during supported catalyst preparation or pre-polymerization (see for example WO 96/18661).

The mixer apparatus may be used according to the invention in batchwise or continuous operation. Continuous operation mechanically fluidized fluid bed mixers are available for example from IdeCon, Porsgrunn, Norway.

Following impregnation with the catalyst and/or co-catalyst, the support can if desired be dried, e.g. to a residual solvent content of less than 3% wt. This is preferably performed using a heated gas flow (e.g. at 40 to 200° C., preferably at 65 to 120° C., especially about 100° C.) and especially preferably is effected while the support is maintained in fluidized state in a fluid bed mixer, e.g. the same mixer as used for catalyst impregnation. The heated gas is preferably a non-reactive gas, e.g. nitrogen or a noble gas such as argon. The use of nitrogen is preferred. Heat transfer in the fluidized zone is very efficient and even on a commercial scale drying may be effected within a relatively short period, e.g. 1 to 15 hours, particularly 3 to 10 hours. Drying however can be effected or accelerated by other heating means, e.g. heating jackets as mentioned above or microwave heating. For microwave heating, a microwave antenna may be immersed in the bed to ensure direct contact and high efficiency (see for example WO 96/34224).

The supported catalyst may be modified further while still in the mixing apparatus (or alternatively following removal from the mixing apparatus). Such modification may include pre-polymerization (as described further below) or addition of for example antistatic or wetting agents. Examples of antistatic agents are discussed in U.S. Pat. No. 5,283,278. Likewise the support material may be chemically or physically treated while in the mixing apparatus before the catalyst solution is applied or alternatively before or during loading into the mixing apparatus. Such treatment may include for example heat treatment (as discussed earlier), treatment to chemically modify the support surface, treatment to introduce catalytically active sites onto the support material particles, impregnation with co-catalysts on catalyst activators, etc. Where catalyst impregnation of support has involved the use of solvents, e.g. organic or more particularly hydrocarbon solvents such as toluene, it is especially advantageous that the catalyst- and/or catalyst/cocatalyst-impregnated support should be dried so as to reduce the solvent content to a very low level. In particular it has surprisingly been found that there is a substantial increase in catalyst activity and performance when the impregnated support is dried such that the organic solvent content is reduced to below 1.5% wt, preferably below 1% wt, more preferably to below 0.7% wt.

In conventional post-impregnation methods of drying supported catalysts (e.g. heating, vacuum, gas treatment and combinations thereof), the residual solvent content is brought down from 10–70% wt to 2–10% wt, or 2–5% wt and the supported catalyst is then packaged, ready-for-use. Between 2 and 10% wt solvent residue, the value of percentage solvent residue does not affect catalyst performance. Thus these super-dried supported catalysts are novel and form a further aspect of the present invention. Viewed from this aspect the invention provides a supported polymerization catalyst dried to contain no more than 1.5% by weight, preferably no more than 1% by weight of organic solvent (e.g. toluene). Viewed from a further aspect the invention provides the use of a supported polymerization catalyst dried to contain no more than 1.5% by weight, preferably no more than 1% by weight of organic solvent (e.g. toluene) in a polymerization process, e.g. an olefin polymerization process.

Such superdrying of supported catalysts, in particular supported metallocene/aluminoxane catalysts, has been observed to increase catalyst activity by as much as 50 to 100%. This increase can be used to reduce total quantities of catalyst used per ton polymer produced, e.g. by use of less supported catalyst or by use of lower concentration levels of catalyst during support impregnation.

The superdrying moreover results in reduced leakage of catalyst materials from the impregnated supports. This in turn may reduce the risk of reactor fouling and the sheeting and chunking in gas phase reactors, and may result in improved polymer morphology.

Reductions in forms of reactor fouling are particularly important as this means reductions in reactor down time, a factor of critical importance in large scale commercial processes.

The supported catalysts can be dried to such super-dried states using conventional procedures but longer than conventional drying times or more extreme drying conditions. Thus such residual moisture contents can be simply achieved by gentle warming with heated nitrogen while being stirred and mixed. However the drying of the impregnated support is preferably carried out in a fluid bed apparatus, e.g. a gas-fluidized bed or, more preferably, a mechanically fluidized bed. The drying effect is achieved by passing a heated gas through the bed of impregnated support as mentioned above, e.g. at 40 to 150° C., preferably about 80° C. Using such fluid bed apparatus for drying results in negligible particle breakdown even when prolonged drying periods are used.

Thus viewed from a yet further aspect the invention provides a method for the production of a supported polymerization catalyst, said method comprising obtaining a porous particulate support impregnated with a catalyst material and with an organic solvent (e.g. obtained by a process according to the invention); and drying said support, preferably with a heated gas flow and preferably in a fluid bed apparatus, to a residual organic solvent content of no more than 1.5% by weight, preferably no more than 1% by weight (relative to the total weight of the dried impregnated support), more preferably no more than 0.75% wt, still more preferably no more than 0.6% wt, e.g. 0.05 to 0.6% wt.

Since such mechanical fluid bed mixers exert relatively low shear forces on the support material, mechanical disintegration of the support and hence generation of unwanted fines, is minimized. This and the uniformity of impregnation represents a significant improvement over the product produced using conventional stirred tanks.

If desired, support impregnation may be effected in a single operation or in a series of operations, optionally with drying being effected between impregnations. Typically, each impregnation step may be effected in 1 to 200 minutes, e.g. 15 to 100 minutes.

While mechanically fluidized bed mixers are commercially available, such mixers have not previously been modified to meet the particular requirements of catalyst impregnation onto particulate support material. Thus viewed from a further aspect the invention provides a mixer apparatus comprising a mixer chamber provided with agitator means for creating a mechanically fluidized particle bed therein, gas inlet means arranged to permit introduction of heated gas into said chamber for passage through a particle bed therein, gas outlet means, liquid inlet means arranged to permit introduction of liquid into said chamber and onto a mechanically fluidized particle bed therein, and preferably also particle separation means arranged to separate particles entrained in gas flow from a particle bed in said chamber and preferably also to return the separated particles to said particle bed; and preferably also a heating or cooling jacket disposed about said mixer chamber.

The supported catalysts may be used for polymer (e.g. polyolefin) production using standard polymerization techniques such as slurry phase and gas phase polymerizations and using standard polymerization reactors such as kettle reactors, loop reactors, gas phase reactors, etc.

If desired, a pre-polymerization of the supported catalyst particles may be effected before these are used in a polymerization reactor. This prepolymerization, e.g. with monomers such as $C_{2-10}$ α-olefins (such as ethene, propene, butene, hexene or 4-methylpentene) or other suitable monomers may even be effected within the mechanically fluidized fluid bed mixer used for preparation of the supported catalyst.

When compared with other mixing techniques for impregnation of a catalyst onto a particulate support, the use of a mechanically fluidized bed of the support material provides significant benefits. As compared with gas fluidized beds, a mixing effect is achieved which is not achieved with gas fluidized beds and solvent loss is reduced or eliminated. As compared with other mechanical mixing methods, the use of a mechanically fluidized bed gives a more even distribution of the catalyst material into the support particles and allows an optimum and essentially uniform loading to be achieved, ie. there is good inter and intra particle uniformity. As a result, the particulate polymer produced using the supported catalysts produced according to the invention has particularly good morphology and improved homogeneity of crystallinity.

Moreover, when compared with polymers prepared using catalysts loaded onto supports by conventional dry-mix methods not only is the reactor powder (the polymer product from the polymerization reactor) considerably more homogeneous, but it also has improved melting performance and as a result requires a significantly shortened processing time.

The process of the invention has a further advantage compared with the production of supported catalysts using conventionally stirred reactors. Thus a higher volume of impregnation solution can be used, corresponding to a slight overfilling of the pores of the support during impregnation. This can be achieved whilst still maintaining the support bed in a dry, free-flowing form. If pore overfilling is attempted in a conventionally stirred tank, this leads to catalyst agglomeration, ie. lump formation. Using the process of the invention with a volume of impregnation solution in excess of total pore volume improves the homogeneity of the catalyst and the properties of the resulting polymer. Typically the impregnation solution may be used in an amount corresponding to 101 to 120% of the pore volume of the non-impregnated support. During impregnation, some of the solvent (e.g. toluene) evaporates into the head space of the mixer apparatus and thus the total volume of the liquid actually impregnating the support may be adjusted to correspond to 100% of the pore volume. This use of "excess" impregnation solution improves the likelihood that all support particles are impregnated relative to standard "dry-mix" stirred tank impregnation procedures where use of greater than 100% pore volume quantities leads to agglomeration as mentioned above.

As compared with conventional dry mixing the process of the invention can achieve a very much higher degree of catalyst loading, in terms of the percentage of support particles that have detectable levels of catalyst loaded thereon. Thus viewed from a further aspect the invention provides a supported olefin polymerization catalyst comprising a particulate support material loaded with a catalyst by a dry-mix procedure, characterized in that at least 60%, more preferably at least 70%, e.g. 70 to 80%, of the support material particles carry levels of catalyst detectable by SEM-EDS (scanning electron microscopy—energy dispersive spectrometry).

Another method used for impregnation of polymerization catalysts into a particulate support is slurry mixing (slurry heterogenization). However this is disadvantageous relative to the process of the present invention since it requires a much larger volume of catalyst impregnation solution to be used and so leads to undesired wastage of expensive raw materials. Furthermore the washing and filtering steps generally required for slurry mixing in order to avoid reactor fouling and ensure good polymer powder morphology and which generate further wastage are not required in the process of the invention.

All patent and other publications referred to herein are incorporated herein by reference.

The invention will now be described in detail with reference to the following non-limited Examples and the accompanying drawings, in which:

FIG. 1 is a schematic representation of a mechanical fluid bed mixing apparatus usable in the process of the invention; and FIGS. 2A, 2B, 3A and 3B are scanning electron micrograph images of catalyst-loaded particles.

Referring to FIG. 1 there is shown a cross-section perpendicular to the mixer paddle axes through a mechanical fluid bed mixer 1. Twin mixer paddles 2 and 3 are counter-rotated about axes 4 and 5 respectively creating a fluidized zone 6 in the particulate support material 7. Liquid 8 containing catalyst and/or co-catalyst (e.g. from an optionally pressurized reservoir 10) is sprayed onto the support material in the fluidized zone 6. Excess liquid may be drained off through valves (not shown) in the base of the mixer chamber 9 and optionally drying gas (e.g. hot gas) may be introduced through inlets, e.g. in the top or the base, of the mixer to dry the impregnated support. (In general however, there will be no excess liquid to drain off—liquid will however be evaporated from the pores of the support material). Entrained particles in the gas outlet (not shown) may be separated in a trap (not shown) and optionally returned to zone 6.

If desired a flow distortion bar may be used with the Forberg mixer.

In the Examples pore volume loading is given as (A/PV)× 100% where A is the volume of catalyst solution loaded onto the catalyst support and PV is the pore volume of the support. Pore volume is measured by the BET procedure described Exp. Methods in Catalytic Research, pages 62 to 96, Academic Press, 1968. (An alternative method of determining pore volume is described by Inns in Analytical Chemistry 28: 332–334 (1956)).

EXAMPLE 1

Preparation of Support Material

Sylopol 2109, a silica from Grace Davison was calcined at 600° C. for 4 hours in dry air.

EXAMPLE 2

Impregnation of Support Material

In a dry box, 0.72 g (1.78 mmol) of (nBu Cp)$_2$ZrCl$_2$ (Eurocene 5031 from Witco) was dissolved in 77.35 mL of MAO solution (30 wt % MAO in toluene solution, 365 mmol Al, available from Albermarle SA). 39.65 mL toluene (distilled from sodium) was added and the mixture was stirred in the dark at ambient temperature for 30 minutes.

65 g of Sylopol 2109 from Example 1 was placed in a bench scale 0.25 L mechanically fluidized bed mixer of the Forberg type in the dry box. 117 mL of the MAO/metallocene solution was added onto the fluidized silica over 3 minutes using a syringe and a spray nozzle to ensure optimum distribution. This corresponded to 1.8 mL solution per gram silica. The impregnated support material was calculated to have an Al:Zr molar ratio of 200, an aluminium content of 11.0 wt % and a Zr content of 0.18 wt %.

Samples of the impregnated support were dried using four different procedures:

A. The supported catalyst was dried for 30 minutes by passing N$_2$ (preheated to 40° C.) at a rate of 230 L/h through the catalyst while still running the mechanically fluidized bed mixer. This gave a final toluene content of about 2 wt %.

B. Drying was first effected as in procedure A. Then nitrogen (preheated to 70° C.) was passed through the catalyst for a further 6 hours at a nitrogen flow rate of 350 L/h. The toluene content of the product was less than 0.5 wt %.

C. The catalyst was withdrawn from the mixer and dried on a hot plate for 1 hour at 40–50° C. using a nitrogen purge.

D. The catalyst was withdrawn from the mixer and dried on a hot plate for 1 hour at 40–50° C. using a nitrogen purge and at a pressure of 0.7 bar below ambient.

Procedure B gave the most satisfactory result.

Figure 2A:
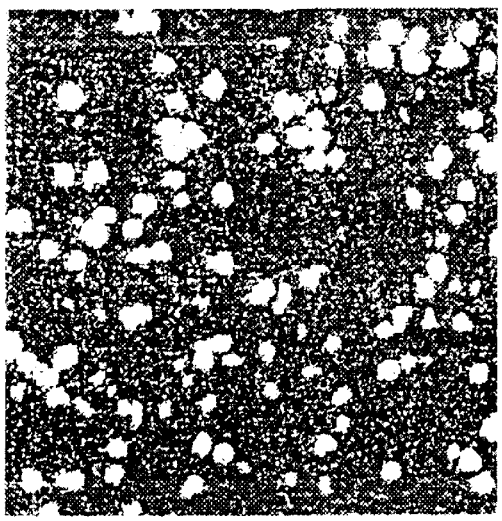
Figure 2B:
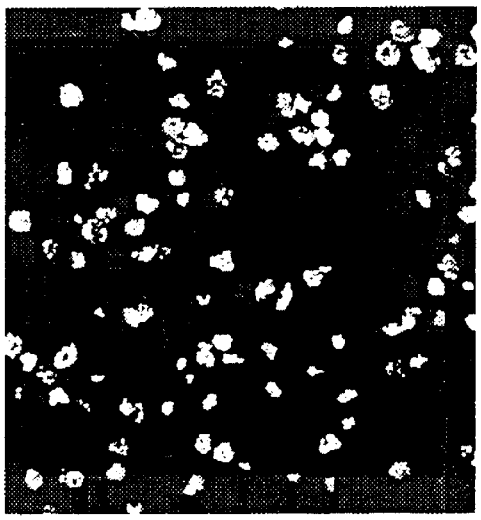
Figure 3A:
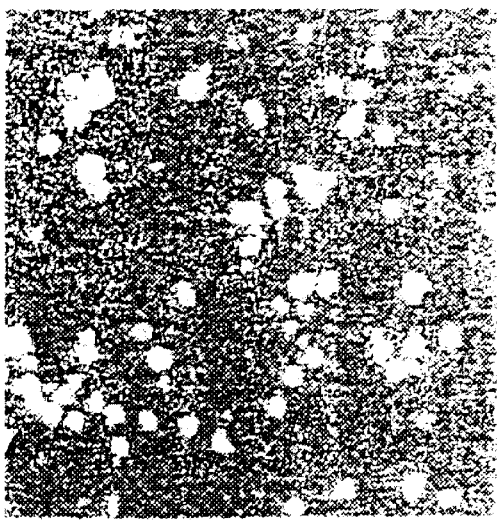
Figure 3B:
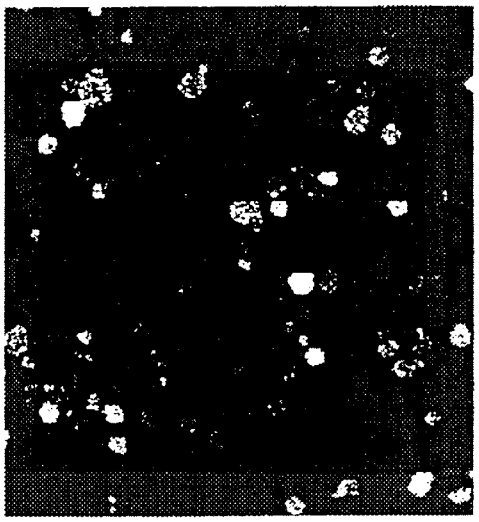

FIGS. 2A and 2B show scanning electron microscope images of a sample of supported catalyst produced as described in this Example. FIG. 2A shows all particles, while FIG. 2B shows those of the particles of FIG. 2A that contain aluminium (ie. successfully catalyst-impregnated particles). It can be seen that almost 100% catalyst impregnation is achieved. By way of comparison, FIGS. 3A and 3B show equivalent SEM images for a sample of supported catalyst produced in a conventionally stirred tank. Only roughly 50% of the particles visible in FIG. 3A can be seen in FIG. 3B, ie. only about 50% are catalyst-loaded.

EXAMPLE 3

Ethylene:hexene Copolymerization

Using the catalyst of Example 2 (dried by procedure B), ethylene was polymerized in a slurry phase reactor.

An 8 L stainless steel reactor equipped with a flash tank was charged with isobutane (3.8 L). 635 mg catalyst was added via an inert tube. Hydrogen (440 ppm) premixed in ethene and 1.40 wt % (relative to ethene) of hex-1-ene were introduced via cascaded addition. The reactor temperature was 94° C. and the reactor pressure was 25.5 bar. The total run time was 45 minutes. After the polymerization reaction, the ethylene hexene copolymer (PEH) was dried in the flash tank for 1 hour with a nitrogen purge. 1829 g polymer (PEH) was produced in one run and 1980 g in another using the same conditions.

Catalyst activity was 3870 kg PEH/g catalyst/hour on run 1 and 4090 kg/g/hr in run 2; the polymer average particle size was 238 µm in run 1, the bulk density 0.44 kg/L for both runs, and the MFR$_2$ 5.5 and 5.2 on runs 1 and 2 respectively. The polymer powder as produced had excellent homogeneity, and is suitable, for example, for rotomoulding.

EXAMPLE 4

Preparation of Support Material

Sylopol 55SJ silica (from Davison Chemical Division, W. R. Grace & Co., Baltimore, Md., USA), was heated at 600° C. for 4 hours in flowing dry nitrogen.

EXAMPLE 5

Impregnation of Support Material 100 g Sylopol 55SJ silica was prepared as in Example 4. A precursor catalyst solution was separately prepared by adding 115 ml 30 w % MAO solution (Albemarle Corp., Baton Rouge, La., USA) to 1.1 g bis(n-butylcylopentadienyl)zirconium dichloride (Eurecene 5031, Witco) followed by the addition of 35 ml toluene. The silica was placed in a Forberg mixer as shown in FIG. 1, and the solution was added to the silica via a spray nozzle during 5 min while running the mixer.

The resulting supported catalyst was finely divided and free flowing. The supported catalyst was dried with hot $N_2$ gas for 60 minutes. A sample was withdrawn and further dried in vacuo for 60 minutes. The calculated loadings of the catalysts were pore volume loading 100%, Al 10.7 wt %, 0.19 wt % Zr, and Al/Zr molar ratio 195.

EXAMPLE 6

Preparation of Support Material

SP9-10180 silica (from Davison Chemical Division, W. R. Grace & Co., Baltimore, Md., USA), was heated at 600° C. for 4 hours in flowing dry nitrogen.

EXAMPLE 7

Impregnation of Support Material 60 g SP9-10180 silica was prepared as in Example 6. 0.66 g bis(n-butylcyclopentadienyl)zirconium dichloride, 69.6 ml 30 wt % MAO solution and 21.6 ml toluene was loaded onto the support as in Example 5. The supported catalyst was dried in an $N_2$ stream. The final catalyst was a free flowing solid. The calculated loadings of the catalysts were loading pore volume 100%, 10.8 wt % Al, 0.19 wt % Zr, and Al/Zr molar ratio 196.

EXAMPLE 8

Impregnation of Support Material 60 g SP9-10180 silica was prepared as in Example 6. 0.7929 g bis(n-butylcyclopentadienyl)zirconium dichloride, 83.5 ml 30 wt % MAO solution and 25.9 ml toluene was loaded onto the support as in Example 5. The supported catalyst was dried with hot $N_2$. The final catalyst was a free flowing solid. The calculated loadings of the catalysts were pore volume loading 120%, 12.3 wt % Al, 0.21 wt % Zr, and the Al/Zr molar ratio was calculated to be 196.

EXAMPLE 9

Preparation of Support Material

Sylopol 2109 silica (from Davison Chemical Division, W. R. Grace & Co., Baltimore, Md., USA), was heated at 600° C. for 4 hours in flowing dry nitrogen.

EXAMPLE 10

Impregnation of Support Material 90 g Sylopol 2109 silica prepared as in Example 9 was loaded with 1.215 g bis(n-butylcyclopentadienyl)hafnium dichloride, 108 ml 30 wt % MAO solution and 54 ml toluene as in Example 5. The resulting supported catalyst was dried with hot $N_2$. The final catalyst was a free flowing solid. The calculated loadings of the catalyst were loading pore volume 120%, 10.9 wt % Al, 0.18 wt % Hf and the calculated Al/Hf ratio was 200.

EXAMPLE 11

Preparation of Support Material

30 µM particle size poly(2-hydroxyethyl)methacrylate-co-ethylene glycol dimethacrylate was heated at 110° C. for 4 hours in flowing dry nitrogen.

EXAMPLE 12

Impregnation of Support Material 132 g poly(2-hydroxyethyl)methacrylate-co-ethylene glycol dimethacrylate (available from Dyno Speciality Polymers) was loaded with 1.89 g bis(n-butylcyclopentadienyl)hafnium dichloride, 168 ml 30 wt % MAO solution and 83.3 ml toluene as in Example 5. The resulting supported catalyst was dried in an $N_2$ stream. The final catalyst was a free flowing solid. The calculated loadings of the catalyst were loading pore volume 112%, 10.9 wt % Al, 0.18 wt % Hf, and the Al/Hf molar ratio was calculated to be 200.

EXAMPLE 13

Preparation of Support Material

Chromium catalyst XPO 9702 (from Grace Davison) was heated at 640° C. for 4 hours in flowing dry nitrogen.

EXAMPLE 14

Impregnation of Chromium Catalyst 132 g of chromium catalyst XPO 9702, prepared as in Example 13 was loaded as in Example 5 with a precursor catalyst solution comprising 157 ml 30 wt % MAO solution, 1.463 g bis(n-butylcyclopentadienyl)zirconium dichloride, 165 ml toluene. The resulting supported catalyst was dried in an $N_2$ stream at 640° C. for 3 hours. The final catalyst was a free flowing solid. The calculated loadings of the catalyst with respect to the metallocene were 11.1 wt % Al, 0.19 wt % Zr and Al/Zr molar ratio 201.

EXAMPLE 15

Impregnation of Support Material 132 g of chromium catalyst XPO 9702, prepared as in Example 13 was loaded as in Example 5 with a precursor catalyst solution comprising 158 ml 30 wt % MAO solution, 1.782 g bis(n-butylcyclopentadienyl)hafnium dichloride 164 ml toluene. The resulting supported catalyst was dried in an $N_2$ stream at 70° C. for 3 hours. The final catalyst was a free flowing solid. The calculated loadings of the catalyst were 11.0 wt % Al, 0.19 wt % Hf and Al/Hf molar ratio 200.

EXAMPLE 16

Preparation of Support Material

Sylopol 2104 silica (from Davison Chemical Division, W. R. Grace & Co., Baltimore, Md., USA), was heated at 600° C. for 4 hours in flowing dry nitrogen.

EXAMPLE 17

Impregnation of Support Material 68 g Sylopol 2104 silica prepared as in Example 16 was loaded as in Example 5 with 0.86 g dimethylsilyl-bis(2-methyl-4-phenyl-indenyl)zirconium dichloride, 90 ml 30 wt % MAO solution and 10 ml toluene. The supported catalyst was dried with hot $N_2$. The final catalyst was a free flowing solid. The calculated loadings of the catalyst were loading pore volume 100%, 13.0 wt % Al, 0.21 wt % Zr and the Al/Zr molar ratio was calculated to be 303.

EXAMPLE 18 (COMPARATIVE)

Impregnation of Support Material

The catalyst was prepared in a dry box. A catalyst precursor was prepared by combining 0.0554 g bis(n-butylcyclopentadienyl)zirconium dichloride and 5.85 ml 30 wt % MAO solution, followed by the addition of 1.9 ml toluene. The solution was stirred for 30 minutes, whereafter it was added to 5.0 g Sylopol 55SJ silica, prepared as in Example 4, placed in a glass flask equipped with a magnetic stirring bar. The supported catalyst was left to stand for 1 hour before being dried at 40° C. for 2 hours. The final catalyst was a free flowing solid. The calculated loadings of the catalyst were loading pore volume 100%, 10.4 wt % Al, 0.19 wt % Zr and the calculated Al/Zr molar ratio was 185.

EXAMPLE 19 (COMPARATIVE)

Impregnation of Support Material

The catalyst was prepared in a dry box. A catalyst precursor solution was prepared by combining 0.1662 g bis(n-butylcyclopentadienyl)zirconium dichloride and 17.85 ml 30 wt % MAO solution, followed by the addition of 9.15 ml toluene. The solution was stirred for 30 minutes, whereafter it was added to 5.0 g Sylopol55SJ silica, prepared as in Example 4, placed in a glass flask equipped with a magnetic stirring bar. The slurry was stirred for 2 hours, thereafter filtered with suction. The catalyst was washed with heptane followed by toluene, and the sticky supported catalyst was dried at 45° C. for 6 hours to yield a free-flowing powder with a calculated Al/Zr molar ratio of 200.

EXAMPLE 20 (COMPARATIVE)

Impregnation of Support Material

The catalyst was prepared in a dry box. A catalyst precursor solution was prepared by combining 0.0675 g bis(n-butylcyclopentadienyl)hafnium dichloride and 6.0 ml 30 wt % MAO solution, followed by the addition of 3.0 ml toluene. The solution was stirred for 30 minutes, whereafter it was added to 5.0 g Sylopol 55SJ silica, prepared as in Example 4, placed in a glass flask equipped with a magnetic stirring bar. The sticky raw catalyst was left to stand for 1 hour, thereafter dried at 45° C. for 2 hours. The calculated loadings of the catalyst were loading pore volume 120%, 11.0 wt % Al, 0.18 wt % Hf and the calculated Al/Hf molar ratio was calculated to be 200.

EXAMPLE 21 (COMPARATIVE)

Impregnation of Support Material

The catalyst was prepared in a dry box. A catalyst precursor solution was prepared by combining 0.060 g dimethyl silylbis(2-methyl-4-phenyl-indenyl)zirconium dichloride and 5.7 ml 30 wt % MAO solution, followed by the addition of 0.5 ml toluene. The solution was stirred for 30 minutes, whereafter it was added to 4.0 g Sylopol 55SJ silica, prepared as in Example 4, placed in a flask equipped with a magnetic stirring bar. The resulting catalyst was a free flowing powder. The resulting catalyst was dried at 45° C. for 6 hours to yield a free-flowing powder. The calculated loadings were 12.6 wt % Al, 0.15 wt % Zr and the Al/Zr molar ratio was calculated to be 275.

EXAMPLE 22 (COMPARATIVE)

Impregnation of Support Material

The catalyst was prepared in a dry box. A catalyst precursor solution was prepared by combining 12.08 g dimethylsilylbis(2-methyl-4-phenyl-indenyl)zirconium dichloride and 1125 ml 30 wt % MAO solution, followed by the addition of 150 ml toluene. The solution was stirred for 30 minutes, whereafter it was added to 268 g Sylopol 55SJ silica, prepared as in Example 4, placed in a glass flask equipped with a mechanical blade stirrer. The slurry was stirred for 2 hours, thereafter filtered with suction. The raw catalyst was washed three times with toluene, and the stick raw catalyst was dried at 45° C. for 15 hours to yield a free-flowing powder with a calculated Al/Zr molar ratio of 275.

Catalyst preparation in Examples 4 to 23 was effected under a nitrogen atmosphere in a dry box.

EXAMPLE 23

Ethylene/1-hexene Copolymerization

An 8 l stainless steel reactor equipped with a flash tank was flushed with nitrogen and subsequently charged with isobutane (3.8 l). A supported catalyst was added via an inert tube. The polymerisation time was 45 minutes. Hydrogen was premixed in ethene (440 ppm). 1-Hexene (1.40 wt % relative to ethene) was added continuously during the polymerisation time. The polymerisation was stopped by depressurizing the reactor. The product was collected and dried in the flash tank for 1 hour with a nitrogen purge. Process data and properties of polymer samples produced are given in Table 1 below:

TABLE 1

| Catalyst Example No. | 5 | 7 | 8 | 10 | 12 | 14 | 15 | 18 | 19 | 20 |
|---|---|---|---|---|---|---|---|---|---|---|
| Reaction Temp.(° C.) | 94 | 94 | 94 | 94 | 94 | 94 | 94 | 94 | 94 | 94 |
| Reaction pressure(bar) | 25.5 | 25.5 | 25.5 | 25.5 | 25.5 | 30.5 | 30.5 | 25.5 | 25.5 | 25.5 |
| Ethene partial pressure (bar) | 7.5 | 7.5 | 7.5 | 7.5 | 7.5 | 12.5 | 12.5 | 7.5 | 7.5 | 7.5 |
| Ethene/H2 ratio (ppm H2) | 320 | 320 | 320 | 2000 | 470 | 1330 | 0 | 460 | 920 | 920 |
| C6/Ethene-Cascade (Wt % C6) | 1.30 | 1.30 | 1.30 | 0.85 | 1.2 | 0 | 0.15 | 1.4 | 1.3 | 1.25 |
| Total Run Time (min) | 51 | 53 | 44 | 45 | 45 | 60 | 55 | 45 | 8 | 45 |
| Productivity (g pol/g cat) | 2340 | 2190 | 4560 | 910 | 680 | 1320 | 980 | 2540 | 400 | 750 |
| Activity (g pol/g cat/h) | 2760 | 2700 | 5000 | 1210 | 940 | 1320 | 1290 | 3480 | — | 1070 |
| MFR2 (powder) | 4.00 | 4.90 | 4.90 | 43.0 | 0.94 | — | — | 5.5 | 6.2 | 5.1 |
| MFR21 (powder) | 60 | 80 | 70 | — | 22 | — | — | 77 | 150 | 88 |

TABLE 1-continued

| Catalyst Example No. | 5 | 7 | 8 | 10 | 12 | 14 | 15 | 18 | 19 | 20 |
|---|---|---|---|---|---|---|---|---|---|---|
| FRR (powder) | 15.0 | 16.3 | 14.3 | — | 23.4 | — | — | 14 | 24.2 | 17.3 |
| Density (powder kg/dm3) | 0.9330 | 0.9500 | 0.9350 | 0.938 | 0.939 | — | — | 0.933 | 0.938 | 0.932 |

EXAMPLE 24

Propene Homopolymerization 2 l stainless steel reactor with a stirrer was flushed with nitrogen. About 100 mg of heterogenised catalyst was added as dry powder via an inert tube. Propylene (1300 mL at 15° C.) was added, and the stirrer was activated. After 10 minutes of prepolymerisation, the temperature was rapidly raised to 70° C. and maintained 50 minutes. Polymerisation was ended by depressurizing the reactor. The polymer was collected and dried in vacuo. The composition of the components in the gas during polymerisation is detailed in Table below together with process data and properties of polymer samples produced.

TABLE 2

| Catalyst Example No. | TEAL (%) | H$_2$ (bar) | React. temp. (° C.) | Activity (g polymer/g catalyst/h) | Mp (° C.) | Melt index | Comments |
|---|---|---|---|---|---|---|---|
| 17 | 0.5 | 0.26 | 70 | 4868 | 153.2 | 14.5 | |
| 21 | 0.2 | 0.22 | 70 | 3030 | 152.0 | 11 | |
| 22 | 0.5 | 0.15 | 70 | 3334 | 150.3 | | Fines |

What is claimed is:

1. A process for the preparation of a supported polymerization catalyst, said process comprising impregnating a porous particulate support in a mechanically fluidized state with a catalyst material, wherein said support is impregnated with said catalyst material in a mixer having horizontal axis counter-rotating interlocking mixing paddles.

2. The process as claimed in claim 1 wherein said catalyst is an olefin polymerization catalyst.

3. The process as claimed in claim 1 wherein said porous support is an inorganic oxide or halide or an organic polymer.

4. The process as claimed in claim 1 wherein said porous support is an inorganic material and is subjected to heat treatment before impregnation with said catalytic material.

5. The process as claimed in claim 1 wherein said support is impregnated with said catalyst material in a mixer having a Froude number of from 1.05 to 2.2.

6. The process as claimed in claim 1 wherein a solution of said catalyst material is sprayed onto said support.

7. The process as claimed in claim 6 wherein the volume of said solution sprayed onto said support is from 0.8 to 2.0 times the pore volume of said support.

8. The process as claimed in claim 1 wherein said catalyst material is selected from at least one metallocene and at least one aluminoxane.

9. The process as claimed in claim 1 wherein after the impregnation of said support with said catalyst material, said support is dried.

10. The process as claimed in claim 9 wherein drying is effected sufficiently to achieve a residual solvent content of less than 3 wt %.

11. The process as claimed in claim 8 wherein said support is impregnated with a solution of said catalyst material in an organic solvent and wherein drying is effected sufficiently to achieve a residual solvent content of less than 1.5 wt %.

12. The process as claimed in claim 11 wherein drying is effected sufficiently to achieve a residual solvent content of less than 1 wt %.

13. A process for the preparation of a polymer, said method comprising impregnating said mechanically fluidized porous particulate support with said catalyst material in process according to claim 1 and polymerizing a monomer or monomer mixture in the presence of the catalyst-impregnated support material.

* * * * *